US006103171A

United States Patent [19]

Cummings

[11] Patent Number: 6,103,171

[45] Date of Patent: Aug. 15, 2000

[54] METHOD AND APPARATUS FOR FACILITATING A GAPLESS ORDER CHANGE IN A CORRUGATOR

[75] Inventor: James A. Cummings, Phillips, Wis.

[73] Assignee: Marquip, Inc., Phillips, Wis.

[21] Appl. No.: 09/075,772

[22] Filed: May 11, 1998

[51] Int. Cl.$^{7}$ .............................. B26D 3/12; B32B 31/18

[52] U.S. Cl. .............................. 264/269; 83/408; 83/428; 156/271; 156/353; 156/523

[58] Field of Search .................................... 156/269, 271, 156/470, 523, 524, 529, 210, 353, 250; 83/408, 428

[56] References Cited

U.S. PATENT DOCUMENTS 4,976,676 12/1990 Mensing et al. .
5,152,205 10/1992 Yoshida et al. .
5,496,431 3/1996 Hirakawa et al. .
5,857,395 1/1999 Bohm et al. .............................. 83/408
5,918,519 7/1999 Schnabel et al. .......................... 83/428
5,927,170 7/1999 Grill et al. .

FOREIGN PATENT DOCUMENTS 44 25 155 7/1994 Germany .

*Primary Examiner*—Mathieu D. Vargot
*Attorney, Agent, or Firm*—Andrus, Sceales, Starke & Sawall

[57] ABSTRACT

A gapless order change in a continuous running corrugated paperboard web, created by using a partial transverse web sever upstream of the web selector device, utilizes selector fork orientation and operation that allows a redirected web portion to be diverted from one slider table to the other with no gap at the transverse slit. The improved apparatus is particularly effective in providing web transition at order change from the lower slider table to the upper slider table where the total width of the output web portions going to the upper level is increased and requires an upward diversion of a redirected web portion.

9 Claims, 5 Drawing Sheets

METHOD AND APPARATUS FOR FACILITATING A GAPLESS ORDER CHANGE IN A CORRUGATOR

BACKGROUND OF THE INVENTION

The present invention pertains to a system for facilitating an order change in the dry end conversion of a corrugated paperboard web. In particular, the invention relates to a method and apparatus for redirecting web portions between knife levels during an order change.

In a corrugator dry end, where a corrugated paperboard web is longitudinally scored and slit into multiple parallel output webs (or "outs"), the outs are directed through one or more downstream cut-off knives which cut the output webs into selected sheet lengths. When two cut-off knives are used, they are vertically separated and each is capable of cutting the full corrugator width web. A web selector positioned downstream of the slitter-scorer, divides the outs into two groups, one of which is directed to the upper cut-off knife and the other to the lower cut-off knife. Order changes must be effected while the upstream corrugator wet end continues to produce and deliver the continuous web to the slitter-scorer. An order change will typically result in a change in widths of the output webs, requiring redirection of at least a central portion of the web from one knife level to the other and possibly changes in edge trim widths as well.

The prior art has developed two basic order change systems for corrugator dry ends utilizing double level cut-off knives. One system is known as a gapless or plunge style order change system. In this system, there are two slitter-scorer stations immediately adjacent one another in the direction of web movement and through both of which the web travels. At order change, one set of slitter-scorer tools, operating on the currently running order, will lift out of operative engagement with the web, and the other set of slitter-scorer tools which is set to the new order alignment plunges down into operative engagement with the web. The result is a small order change region of corrugated web with overlapping slits and scores for both the running and the new orders.

Any gapless order change system must be able to accommodate redirection of the central portion of the web in the web selector device from one knife level to the other. In U.S. Pat. No. 5,496,431, a laterally adjustable cutting tool, positioned over the center of the web, makes a running diagonal cut to provide a smooth transition in the widths of the output webs directed to the upper and lower cut-off knives, allowing a repositioning of the web directing forks in the web selector device. In this system, the order change region of the web containing the diagonal connecting slit and the overlapping slit and score lines requires the use of separate diverters downstream of each of the upper and lower cut-off knives to divert the resultant scrap sheets. The diagonal pieces which are created by the system of this patent cannot be discharged in the usual manner onto the top of the stack, particularly when changing from a narrow web to a wide web on either knife level. The diagonal piece would fall off the top of the stack. Therefore, the system of this patent must have a diverter after each knife level.

In German Patent 44 25 155, the output webs exiting the slitter-scorer are simultaneously cut to chop out a scrap sheet containing the overlapping slits and scores from the running and new orders. The gap created by chopping out the scrap portion allows repositioning of the web directing forks at the web selector device. This system is not a true gapless order change, but does utilize pairs of alternately operable plunge cut slitter-scorers. This system also requires a separate rotary shear and a scrap sheet diverter between the slitter-scorer and the cut-off knife. In addition, because the scrapped out sheets may have many slits resulting in a limp and unstable sheet, they are difficult to divert and often result in jams.

The other type of order change system, a gap style order change system requires the use of a rotary shear located immediately downstream of the corrugator wet end. At order change, the rotary shear is operated to make a cross cut through the entire web. The downstream dry end equipment is accelerated to pull a gap between the tail edge of the running order and the leading edge of the new order defined by the shear cut. As the tail edge of the web passes through the slitter-scorer, the slitting and scoring tools can be repositioned in the gap and set for the new order. Alternately operable plunge cut slitter-scorers may also be used in a gap style order change. Similarly, as the trailing edge passes through the web selector device, it can be reset to change the direction of outs in the leading edge of the new order between the top and bottom cut-off knives.

In accordance with the invention described in my copending application Ser. No. 09/075,773 entitled "Method and Apparatus for Providing a Gapless Order Change in a Corrugator", an order change is effected without severing the web completely at the rotary shear, and by using a plunge cut slitter-scorer having two slitter-scorer stations. The apparatus and method of that invention utilize a partial sever transversely across the web at a position between the conventional rotary shear and the web selector device immediately downstream from the slitter-scorer. The partial web sever may extend from either lateral edge of the web with a preferred choice of edge based upon the narrowest set of outs for the new order. However, web redirection requirements at order change may dictate slitting from the opposite edge. The partial web sever allows the forks of a conventional output web selector device to be readjusted downstream of the slitter-scorer to redirect the output webs between the upper and lower cut-off knives as required. Two alternately operable slitter-scorers are utilized as in prior art gapless systems. The partial web sever allows the order change to be effected with a continuous unbroken web containing the outs for the cut-off knife level handling the output web portions opposite the partial sever.

Prior art web selector devices typically include a series of laterally aligned web selector forks which are pivotally attached along a common horizontal axis and are individually adjustable to direct web portions generally horizontally along a lower slider table to the lower knife level or in an upwardly inclined direction along an inclined upper slider table to the upper knife level. The pivotal forks (which are actually in the nature of individual long finger-like elements) are mounted with the common pivot axis on the upstream end such that the forks may be selectively positioned with their downstream ends adjacent either the upstream edge of the lower slider table or the upstream edge of the upper slider table. Under certain of the order change strategies described in my above identified copending application, there may be little or no longitudinal gap between web portions downstream and upstream of a portion of the transverse slit and, if the web selector forks corresponding to such web portion are lifted too soon to redirect the web portion from the lower to the upper slider table, the tail-out portion going to the lower slider table may have to be raised before it clears the downstream end of the forks, thereby possibly damaging or jamming the web. Conversely, if the upward pivotal movement of the forks is delayed to allow the tail-out portion to clear, the lead edge of the new order web portion may collide with the downstream end of the upper slider table with predictably bad results.

In accordance with certain order change strategies discussed in the above identified patent application, there may be no gap whatever in the redirected web portion, making it virtually impossible to effect a change in the direction of the web either up or down using conventional devices. Furthermore, as the location where the transverse web sever is made is moved in the downstream direction closer to the web selector device, there is less time for a longitudinal gap to be pulled to provide space for effecting web selector fork repositioning.

SUMMARY OF THE INVENTION

In accordance with the present invention, a selector fork positioning and operation strategy allows a redirected web portion to be diverted from one slider table to the other with no gap at the transverse slit. The present method and apparatus are particularly effective in providing fork transition from the down to the up position where the total width of the output web portions going to the upper level is increased, requiring the upward diversion of a redirected web portion.

In the apparatus of the present invention, the web selector forks are pivotally attached on a common horizontal fork axis to the upstream end of the upper slider table so that the forks extend in the upstream direction to their upstream ends. The forks are positioned vertically above the lower slider table so that the forks overlie the upstream end thereof. The forks are individually rotatable on their axis between a running position in which the forks lie in generally coplanar alignment with the upper slider table and the fork ends spaced above the upstream end of the lower slider table, and a divert position in which the forks ends are pivoted downwardly into operative engagement with the upstream end of the lower slider table. A lift pan is pivotally mounted under the web upstream of the slider tables on a horizontal pan axis which is parallel to the fork axis. The lift pan has a web support surface which extends in the downstream direction from the pan axis to an edge, the pan being pivotable between a running position with the web support surface lying generally coplanar with the lower slider table, and a divert position with the pan edge pivoted upwardly to a position adjacent the fork ends in the running position. A control device is responsive to the position of a transverse web slit which defines the leading edge of the redirected web portion to pivot the lift pan and the selector forks corresponding to the width of the redirected web portion from the running position to the divert position.

The apparatus is particularly well adapted to handle an order change transition between a running order and a new order which includes an increase in the total width of the upper output web portions from the running order to the new order. The forks may be equally spaced across the width of the web, and the lift pan is preferably unitary in construction and extends across the full width of the web.

The apparatus may also include pivotal edge fingers which define the upstream end of the lower slider table and are attached thereto on a pivot axis parallel to the fork and pan axes. The edge fingers have a top surface substantially coextensive with the lower slider table in a running position. The edge fingers are positioned to be engaged and pivoted downwardly by the selector fork ends as the ends are pivoted downwardly to the divert position. A bias mechanism operates to return the edge fingers to the running position in response to return of the selector forks to the running position. The edge fingers extend across the full width of the lower slider table.

In accordance with the method of the present invention, a selected width of an output web portion which must be vertically redirected at order change is defined by one of a plurality of longitudinally slit portions of a moving paperboard web, which slit portions define laterally adjacent upper and lower output web portions and are directed, respectively, to an upper web table and a lower web table to define a running order. The selected width output web portion represents an increase in the total width of the upper output web portion and a corresponding decrease in the adjacent lower output web portion defining a new order. The preferred method includes the steps of selecting an order change region in the web which defines a transition from the running order to the new order, adjusting the slit portions in the order change region from the running to the new order such that the running order and new order slit portions overlap longitudinally, slitting the web in the order change region and upstream of the web tables in a transverse direction to provide a transverse slit in at least the full selected width between slit lines, and separating the web vertically and upstream of the web table at said transverse slit to direct the selected width web portion of the transverse slit onto the upper web table. The method also preferably includes the steps of positioning the upper and lower web tables in vertically spaced relation with their respective upstream edges generally vertically aligned, and separating the web by simultaneously lifting the web vertically and maintaining the selected width web portion downstream of the transverse slit on the lower web table.

The step of separating the web may further comprise providing the upper web table with web selector forks which are pivotally attached to the table on a common laterally extending horizontal fork axis, the forks extending to upstream fork ends which define the upstream edge of the web; pivoting the forks corresponding to the transverse slit downwardly onto the selected width web portion downstream of the transverse slit on the lower lift table; and supporting the selected width web portion upstream of the slit on said downwardly pivoted forks to direct said selected web portion onto the upper web table. The lifting step may comprise positioning a pivotal lift pan under the web upstream of the web tables on a horizontal pan axis with a web supporting pan surface extending downstream, and pivoting the pan upwardly to lift the web. The method may also include the steps of providing the lower web table with pivotal edge fingers defining the upstream end of the table and are attached thereto on a pivotal axis parallel to the fork axis, biasing the edge fingers upwardly to lie in the plane of the lower web table, and deflecting the edge fingers downwardly with the ends of the forks in the pivoting step.

DETAILED DESCRIPTION OF THE INVENTION

Figure 1:
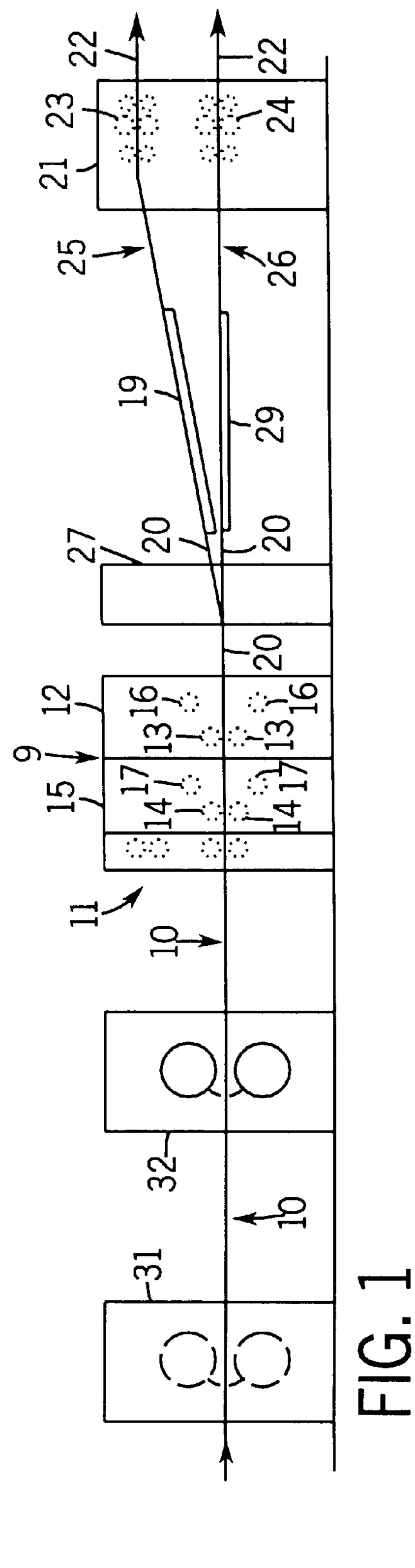
FIG. 1 is a schematic side elevation of a corrugator dry end modified to incorporate the apparatus and to practice the method of the present invention.

Referring to FIG. 1, a continuous corrugated paperboard web 10 enters a corrugator dry end 11 from an upstream wet end (not shown) where the component webs are processed, glued together and cured for dry end processing. The dry end system shown is adapted to process order changes by using either a gap style system or a gapless plunge type system of the present invention. While an order is running, the continuous web 10 passes through a slitter-scorer station 9, including a slitting station 12 having two pairs of upper and lower slitting tools 13 and 16, and a scoring station 15 having two pairs of scoring tools 14 and 17. However, only one pair of slitting tools 13 and one pair of scoring tools 14 is in operative engagement with the web 10 while the order is being run. The other pairs of slitting tools 16 and scoring tools 17 are inoperative and, as shown, are withdrawn from operative contact with the web. In the slitting station 12 and the scoring station 15, the web 10 is provided with longitudinal score lines (not shown) and longitudinal slit lines 18, which are shown schematically in various order patterns in the webs of FIGS. 2–4. The continuous longitudinal slits 18 define a series of output webs or outs 20 which continue downstream into a cut-off knife 21 where the webs are cut into selected length sheets 22. The sheets 22 are conveyed downstream into a stacker (not shown) or other suitable collecting device.

Figure 2:
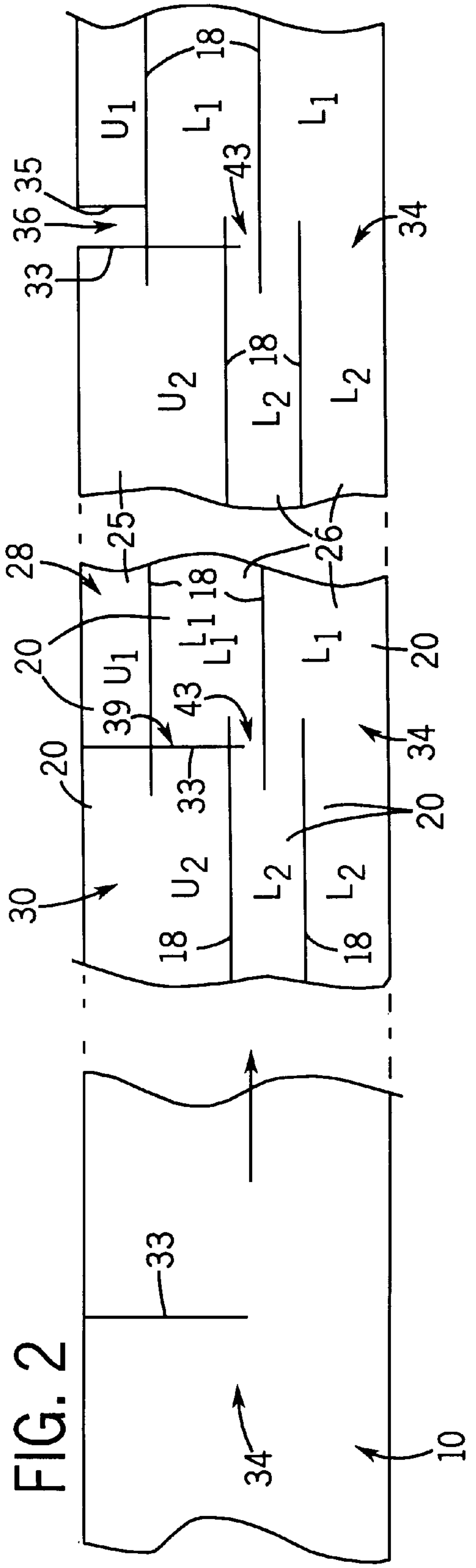
FIG. 2 is a schematic top plan view showing an order change sequence in a traveling paperboard web processed by the apparatus and method of the present invention.

In the system shown in FIG. 1, a two level or duplex cut-off knife 21 includes an upper cut-off knife 23 and a lower cut-off knife 24. Each of the knives 23 and 24 is capable of processing any arrangement of outs 20 up to the full width of the web 10. However, two cut-off knives are typically utilized to enable two independent sheet orders to be processed simultaneously, where the sheet lengths and widths may vary considerably between running orders. Thus, one set of upper output web portions 25 is directed to the upper cut-off knife 23 and a set of lower output web portions 26 is directed into and through the lower cut-off knife 24. The output webs 20 exiting the slitter-scorer station 9 are separated vertically in a web selecting device 27 in which selectively positionable forks in an array extending across the full width of the web 10 are positioned to direct the respective upper and lower output web portions 25 and 26 to the correct cut-off knife 23 or 24. The forks in the web selector 27 are thus selectively positioned to direct the respective output web portions 25 and 26 onto upper and lower slider tables 19 and 29 which support the outs and direct them into their respective knives 23 and 24. In FIG. 2, for example, the current running order is comprised of a single upper output web 25 also identified as $U_1$ and a pair of lower output webs 26, each identified as $L_1$. Furthermore, the FIG. 2 example assumes that an order change will result in an immediately following new order 30 comprising a single upper output web $U_2$, substantially wider than running order output web $U_1$, and a pair of lower output webs $L_2$, each narrower in width than the running order lower output webs $L_1$.

In the schematic system shown in FIG. 1, an upstream rotary shear 31 is shown for use in a gap-type order change system. As indicated above, rotary shear 31 provides a complete web cross cut, but is not utilized with the gapless order change of the present invention. Instead, an order change signal is used to operate a second rotary shear 32 which is positioned between the conventional rotary shear 31 and the web selector device 27 to provide a partial web sever in the form of a transverse slit 33. The transverse slit 33 preferably extends slightly more than half the width of the web 10 and, therefore, rotary shear 32 has an effective cutting blade length sufficient to provide said transverse slit 33. In order to adapt the system of the invention to handle order changes of any size, a similar rotary shear 32 (not shown) is positioned adjacent the first, but on the opposite side of the web to provide a similar transverse slit from that opposite edge. The transverse slit 33 defines the approximate longitudinal center of an order change region 34 where the slitting and scoring tools 13 and 14 operating on the running order 28 are retracted and the slitting and scoring tools 16 and 17, preset to handle the new order 30, are "plunged" into operative engagement with the web 10. Thus, as shown in the center transitional view in FIG. 2, the order change region 34, carrying the transverse slit 33, exits the slitter-scorer with overlapping slit lines 18 from the running order 28 and the new order 30. This region will also include overlapping of score lines (not shown) from the running and new orders.

The substantial increase in width of the upper output web $U_2$ in the new order 30 from the upper output web $U_1$ of the running order 28 requires that a portion of the width of the immediately adjacent output web $L_1$ of the running order 28 be diverted from the lower knife level 24 to the upper knife level 23 in order to effect the order change. The transverse slit 33 provides the break in the web 10 which allows the selector forks in the web selecting device 27 to be repositioned to redirect the web portion 39 defining the transition from running order web $L_1$ to new order web $U_2$. However, a portion 43 of innermost running order web $L_1$ is not severed by the transverse slit 33 and is connected to the innermost output web $L_2$ of the new order 30. The order change is, therefore, effected at the slitter-scorer with no gap and with a continuous web (output web portions $L_1$ and $L_2$) into the lower cut-off knife 24.

In the righthandmost transitional view of FIG. 2, the transverse slit 33 may be synchronized exactly with the end of the running order 28 such that the tailout end 35 of running order output web $U_1$ coincides with the slit 33. A gap 36 between the transverse slit 33 and the tailout end 35 is formed as web $U_1$ accelerates away from web $U_2$ as a result of the overspeed of the pull roll at downstream knife 23. However, because it will normally not be possible to also attain exact synchronization of the transverse slit 33 and the subsequent knife cut defining the end of the order for the lower output webs $L_1$, an alternate end of order knife cut strategy needs to be considered, as described in my above identified copending application. The tail end sheets cut from the lower output web portions $L_1$ of the expiring order will have overlapped slits and score lines but, because only the upper run $U_1$ can be synchronized with the order change, the resultant waste sheets in the transition between webs $L_1$ and $L_2$ would be scrapped in any event. These scrap sheets, created at the tail end of the order, would end up on the top of the stack where the top sheet is considered scrap anyway. Similarly, scrap associated with overlapping slits and scores on the leading edge of output web portions $L_2$ for the new order would go into the stacker as the first sheet in the stack and would also generally be considered scrap because of conveyor damage.

Figure 5:
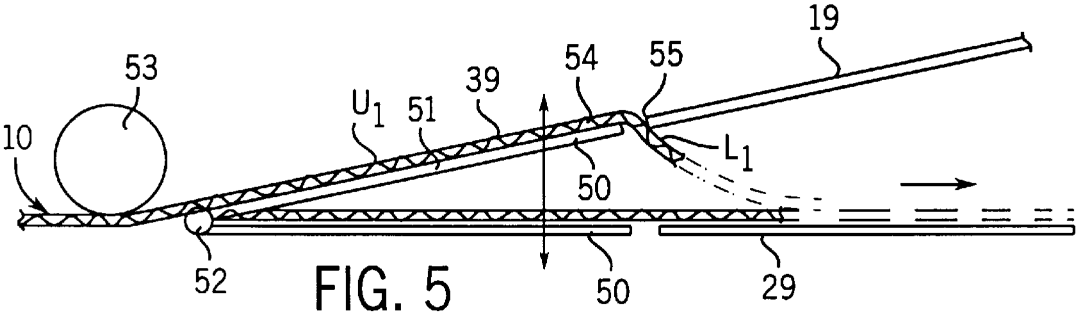
FIG. 5 PRIOR ART
FIG. 5 is a schematic side elevation view of prior art web selector forks in association with the respective web supporting slider tables.

FIG. 5 shows schematically the construction and operation of prior art web selector forks used to change the vertical direction of web portions during an order change between the upper and lower level cutoff knives 23 and 24. The web selector forks 50 typically comprise 1–½ inch (38 mm) wide tines 51 mounted on 3 inch (76 mm) centers along a common horizontal rotational axis 52, which axis is on the upstream ends of the forks. The fork tines 51 are individually rotatable between a lower position in alignment with the lower slider table 29 and an upper position in alignment with the upper slider table 19. Upstream of the fork axis 52, a holddown roll 53 is typically provided to assist in web redirection from the lower to the upper slider table.

In the order change sequence just described with respect to FIG. 2, the rather wide redirected web portion 39 which must be redirected from the lower to the upper knife level, must be vertically separated from the tail of web $L_1$ early enough to prevent the lead edge 54 of new output web $U_2$ from colliding with the upstream edge 55 of the upper slider table 19. However, this may result in the tail end of running order output web $L_1$ being lifted as well and forced through a narrow window between the downstream end of the raised forks and the upstream end of the upper slider table 19, as shown in prior art FIG. 5. The lack of precise timing or the processing of heavy wall corrugated board may result in damage to either the tail end of web $L_1$ or the lead end of web $U_2$ along the portion of the slit line 33 defining the redirected web portion 39.

Figure 3:
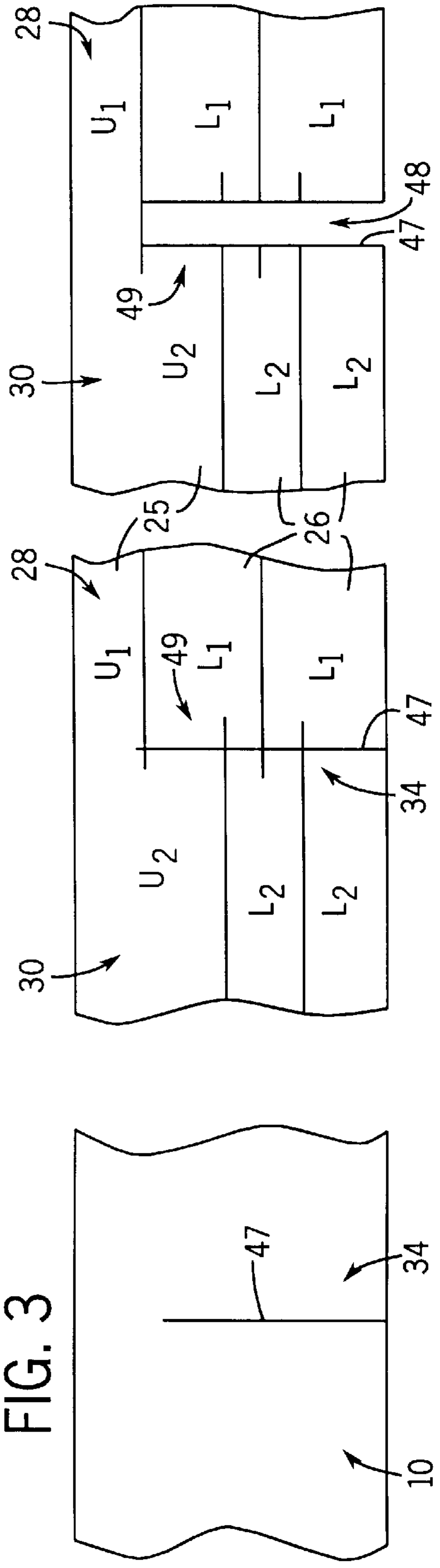
FIG. 3 is a schematic representation of an alternate strategy for effecting the order change of FIG. 2.

However, the foregoing difficulty may be avoided by utilizing the strategy shown in FIG. 3. In this alternate order change strategy, the old and new output web portions 25 and 26 are identical to those in the FIG. 2 example. In FIG. 3, however, the web is severed with a transverse slit 47 which extends inwardly from the edge of the web opposite that of slit 33 in the FIG. 2 example. As shown, the slit 47 must be long enough to extend at least the full width of the running lower output web portions $L_1$ (which are wider than the corresponding new order web portions $L_2$). As soon as the order change region 34 carrying the transverse slit 47 leaves the slitter 11, the overspeed pull rolls in the lower level knife 24 will pull a gap 48 between the running and new lower output web portions $L_1$ and $L_2$, as shown in the righthand-most view of FIG. 3. The gap 48 will provide adequate space to allow the forks 50 in a prior art web selector 27 to be raised along the width of a redirected portion 49 forming a part of output web $L_1$ after the tail edge of $L_1$ has left the forks and before the lead edge of $U_2$ is fully onto the forks. It should be noted that the redirected web portion 49 corresponds to the same redirected web portion 39 in the FIG. 2 example.

The potential problem created by the relatively wide redirected web portion 39 in the FIG. 2 example, which is obviated by the strategy described with respect to FIG. 3, suggests an order change strategy based upon the relative widths of the upper output web portions 25 of the old and new orders $U_1$ and $U_2$, respectively. If the total width of the new order outs $U_2$ is greater than the total width of the running order outs $U_1$, the slit should be made from the opposite side (as in the FIG. 3 example). If the width of new order $U_2$ is narrower than the width of running order $U_1$, then the slit may be made from either side, depending upon the narrowest new order upper and lower output web portions 25 or 26 (thereby keeping the length of the transverse slit 33 or 47 as short as possible).

Figure 4:
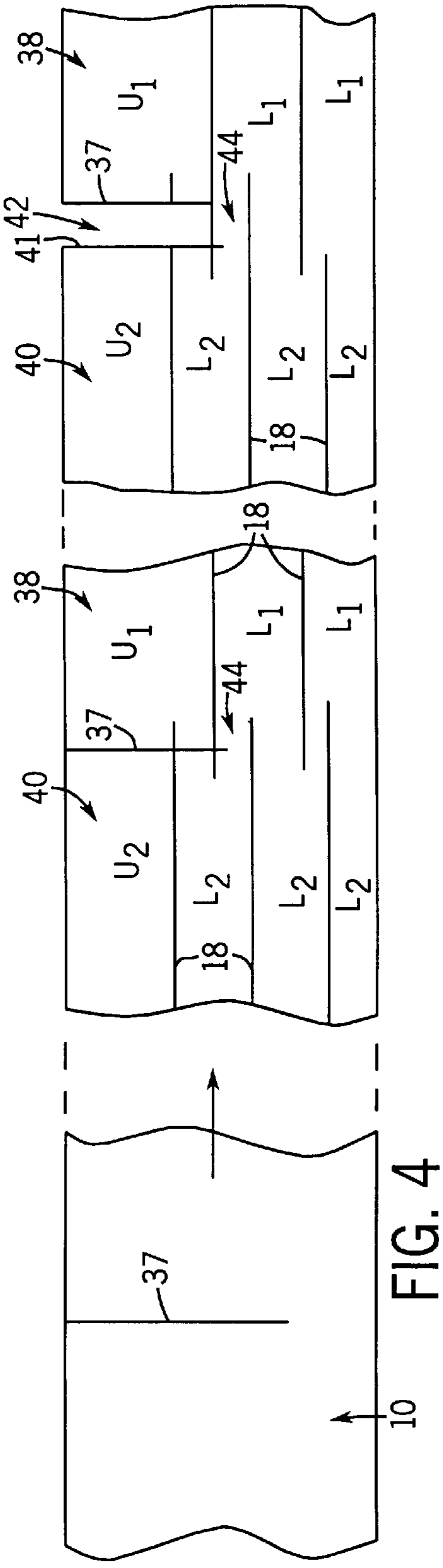
FIG. 4 is a schematic view similar to FIG. 1, showing another order change sequence.

A somewhat different order change sequence is shown in FIG. 4, but is also enabled by a transverse slit 37 severing half the width of the web 10 by operation of the gapless rotary shear 32, as described above. As the transverse slit 37, defining the order change region, passes through the slitter-scorer station 9, the slitting and scoring tools 13 and 14 are withdrawn from the running order 38 and the slitting and scoring tools 16 and 17 are plunged into operative engagement with the web 10 for the new order 40. In the FIG. 4 sequence, upper output web $U_1$ of the running order is substantially wider than the upper output web $U_2$ of the new order. Nevertheless, the transverse slit 37 provides an interruption in the running web sufficient to allow readjustment of the web selecting device 27 enabling the innermost portion of upper output web $U_1$ to be redirected downwardly to form the innermost edge portion of the innermost new order output web $L_2$. Overall web continuity of the lower web portions $L_1$ and $L_2$ is maintained because the transverse slit 37 does not extend laterally far enough to completely sever the innermost new order lower output web $L_2$, as shown by unsevered portion 44.

In the final transitional view of the FIG. 4 sequence, running order web $U_1$ has been accelerated by the overspeed pull roll at the knife 23 to define a gap 42. Operation of the shear 32 may be timed such that the transverse slit 37 coincides exactly with the order change and leading edge 41 of new upper out $U_2$ defines the leading edge of the first sheet of the new order. The overlapping slit and score lines associated with the running and new order lower level outs $L_1$ and $L_2$ are scrapped out, as described in the FIG. 2 system, in sheets which go out respectively onto the top of the last stack for the old order and the bottom of the first stack for the new order.

In all of the foregoing examples, the transverse slit 33, 37 or 47 must extend inwardly from the lateral edge of the web 10 to sever at least a portion of the web representative of the larger of the total width or widths of the running order 38 and new order 40, selected from either the upper output web portions 25 or the lower output web portions 26. Thus, in the example of FIG. 2, the transverse slit 33 must be at least as long as the width of new order upper output web $U_2$ (which is wider than running order upper output web $U_1$). In the FIG. 3 example, the slit 47 was taken from the edge opposite that of FIG. 2, resulting in a substantially longer slit but one which obviated a potential web handling problem. In the FIG. 4 example, the transverse slit 37 must be at least as long as the total width of running order upper output web $U_1$ (which is wider than new order upper output web $U_2$). A further consideration is that the innermost running order and new order output webs for the unslit portion of the main web 10 (in the FIG. 2 and FIG. 4 examples, innermost webs $L_1$ and $L_2$) remain at least partially uncut by the respective transverse slits 33 and 37. These uncut transition portions are shown by the reference numbers 43 in FIG. 2 and 44 in FIG. 4. In the FIG. 3 example, the corresponding portions not cut by transverse slit 47 are the common portions of $U_1$ and $U_2$. A final consideration is that the transverse slit 33 or 37 should ordinarily be provided in the portion of the web representative of the narrower of the new order upper and lower output web portions 25 or 26. In the FIG. 2 example, the choice is not readily apparent because the upper output web $U_2$ is approximately equal to the combined widths of the lower output webs $L_2$. However, in the FIG. 3 example, the transverse slit 47 is made from the opposite edge of the web 10 for the reason discussed above, even though the respective new order output webs in FIGS. 2 and 3 are the same.

The order change strategies thus far described have all utilized transverse slits (e.g. 33, 37 and 47) that are made with a slitting device (e.g. rotary shear 32) which is located upstream of the slitter scorer station 9. However, all of the foregoing order changes may be effected by making the transverse slit anywhere upstream of the web selector device 27. For example, the rotary shear or other device for providing the partial transverse web slit could be located between the scoring station 15 and the slitting station 12, or between the slitting station 12 and the web selector 27. An advantage of locating the web slitting device immediately downstream of the slitting station 12 is that the trim chutes, which catch and divert the edge trim pieces, may be located immediately downstream of the device for providing the transverse slit so that the trim transition piece would not have to travel between slitting tool pairs 13 and 16 where loss of control and jam-up of the lead edge of a trim piece could occur. A disadvantage of locating the transverse slitting device downstream of the slitter-scorer is that the overspeed on the pull roll of the downstream cut-off knife 21 would provide less time to pull the gap (e.g. 48 in FIG. 3) in which to adjust the forks in the web selector device 27.

In accordance with the apparatus and method of the present invention, and referring also to FIGS. 6–11, an order change may be effected in the manner of any of the examples described above without regard to the length of the gap between running and new order outs and, indeed, even if there is zero gap. Therefore, the advantages of providing the transverse web sever immediately upstream of the web selector device 27 may be utilized without concern for the need to provide a relatively long fork adjusting gap. The order change sequence to be described is based on the FIG. 3 strategy and will utilize the same reference numbers and letters to describe the web components. However, as indicated, the construction and operation of the web selector device of the present invention permits its use for effecting gapless order changes in accordance with all of the strategies described in my above identified copending application, in addition to the those described herein.

In accordance with the present invention, the web selector forks 56 are pivotally attached along a common horizontal fork axis 57 to the upstream end 58 of the upper web slider table 19. The forks 56 thus extend in the upstream direction and terminate in free upstream ends 60 which are preferably suitably rounded to facilitate smooth web movement thereover. The forks 56 are mounted for individual rotational movement on the fork axis 57 and are also individually controlled such that selected groups of forks corresponding to selected width output web portions, such as the redirected web portion 49, may be diverted from a running position in which the forks are generally in coplanar alignment with the upper web table 19 to a divert position with the fork ends 60 pivoted downwardly into operative engagement with the upstream end of the lower web slider table 29.

Figure 8:
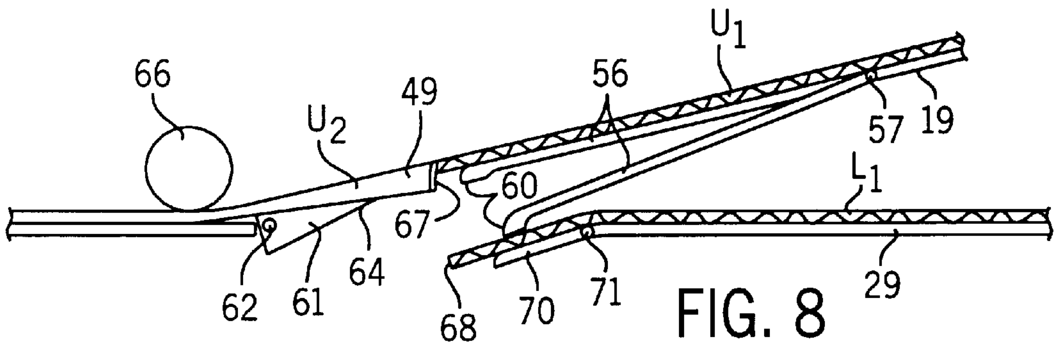
Figure 9:
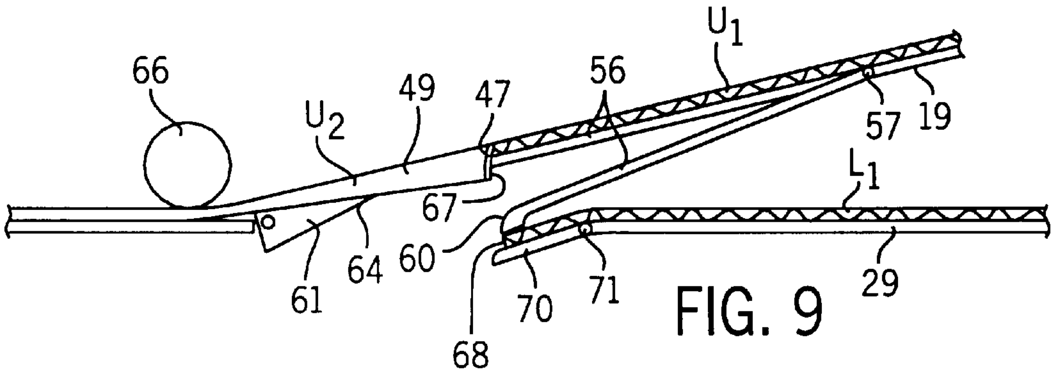

A lift pan 61 is pivotally mounted beneath the web 10 upstream of the web supporting tables 19 and 29. The pan pivot axis 62 is positioned along the upstream edge of the pan 61 and extends with the pan across the full width of the web. The pan 61 has a web support surface 63 which lies generally coplanar with the lower web slider table 29 in a running position. When the pan 61 is rotated upwardly to a divert position, the downstream pan edge 64 is positioned adjacent the fork ends 60, as shown in FIGS. 8 and 9. In both the running and divert positions of the lift pan 61, the pan edge 64 is closely spaced from the respective upstream edges of the slider tables 19 and 29, the gap therebetween for example being about 1–½ inches (38 mm).

Figure 6:
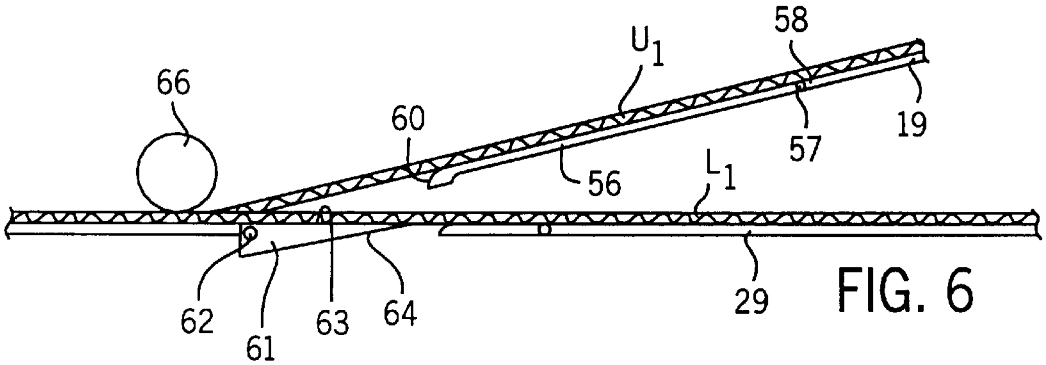
FIGS. 6–10 are schematic side elevation views of the web redirection apparatus of the present invention showing the transition of the redirected portion during an order change.

The web selector forks 56 are normally pivoted up to the running position as shown, for example, in FIG. 6. When it is desired to divert some portion of the web from the lower level to the upper level, such as the redirected web portion 49, the forks 56 corresponding only to the lateral width of the selected web portion are pivoted downwardly against the surface of the lower web slider table 29, as shown for example in FIG. 7. Web selector fork repositioning from the upper running position to the lower divert position is coordinated with upward rotation of the lift pan 61 to redirect the selected width web portion from generally horizontal movement over the lower web supporting slider table 29 upwardly onto the inclined web supporting surface of the upper slider table 19. As will be described in greater detail, the divert repositioning of the forks 56 and lift pan 61 is synchronized with passage of the transverse slit 47 over these devices.

Referring again to the order change sequence of FIG. 3, a detailed description of operation of the improved web selector device will be made. As indicated above, however, one advantage of the present invention is that a redirected web portion may be diverted with a much smaller longitudinal gap or without any gap at all. This also allows the transverse slit (e.g. 47) to be made downstream of the slitter-scorer station 9 which, as previously described, eliminates certain potential problems in handling edge trim pieces. Edge trim pieces are cut and diverted into the trim chutes upstream of the transverse slit in the example to follow. In the schematic side elevation of FIG. 6 (which may be considered to be viewing the web transition in a vertical plane through the slit line 65 dividing new order upper output web $U_2$ from new order lower output $L_2$), the web is shown entering the web selector device 27, but before the transverse slit 47 has reached the divert position. The running order output webs, including upper output web $U_1$ and lower output web $L_1$ are shown proceeding over their respective upper and lower slider tables 19 and 29. As in the prior art device of FIG. 5, a holddown roll 66 is utilized to assist in the redirection of all upper level web portions (e.g. $U_1$). FIG. 6 depicts a normal running position for both the selector forks 56 and the lift pan 61.

Figure 7:
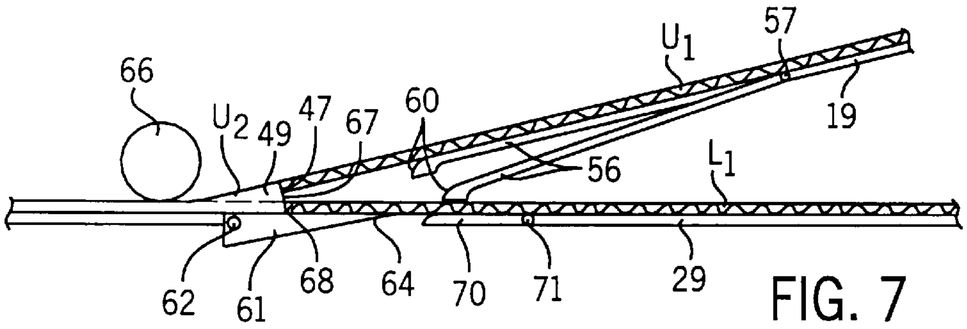

In FIG. 7, the transverse slit 47, separating the running order 28 from the new order 30, has been made upstream of the holddown roll 66 and has moved just past the roll and onto the lift pan 61. Because the transverse slit 47 has been made immediately upstream of the holddown roll 66 (rather than having been made further upstream of the slitter-scorer station 9, as shown in FIG. 1), there will be little or no gap between the trailing edge 68 of running order lower output web portion $L_1$ and the lead edge 67 of new order upper output web portion $U_2$. Thus, the gap 48 shown in FIG. 3 will be substantially reduced or absent altogether. The redirected web portion 49 forming the lead edge of new order upper output web portion $U_2$ remains connected to running order output web portion $U_1$. As a result, the redirected portion of $U_2$ will follow the remainder of the full width web portion $U_2$ and, as shown in FIG. 7, will begin to be lifted from the horizontal to travel with running order upper web portion $U_1$ toward the upper slider table 19. If the forks 56 were left in the upper running position, the lead edge of the redirected web portion 49 would collide with the forks in its path.

Figure 11:
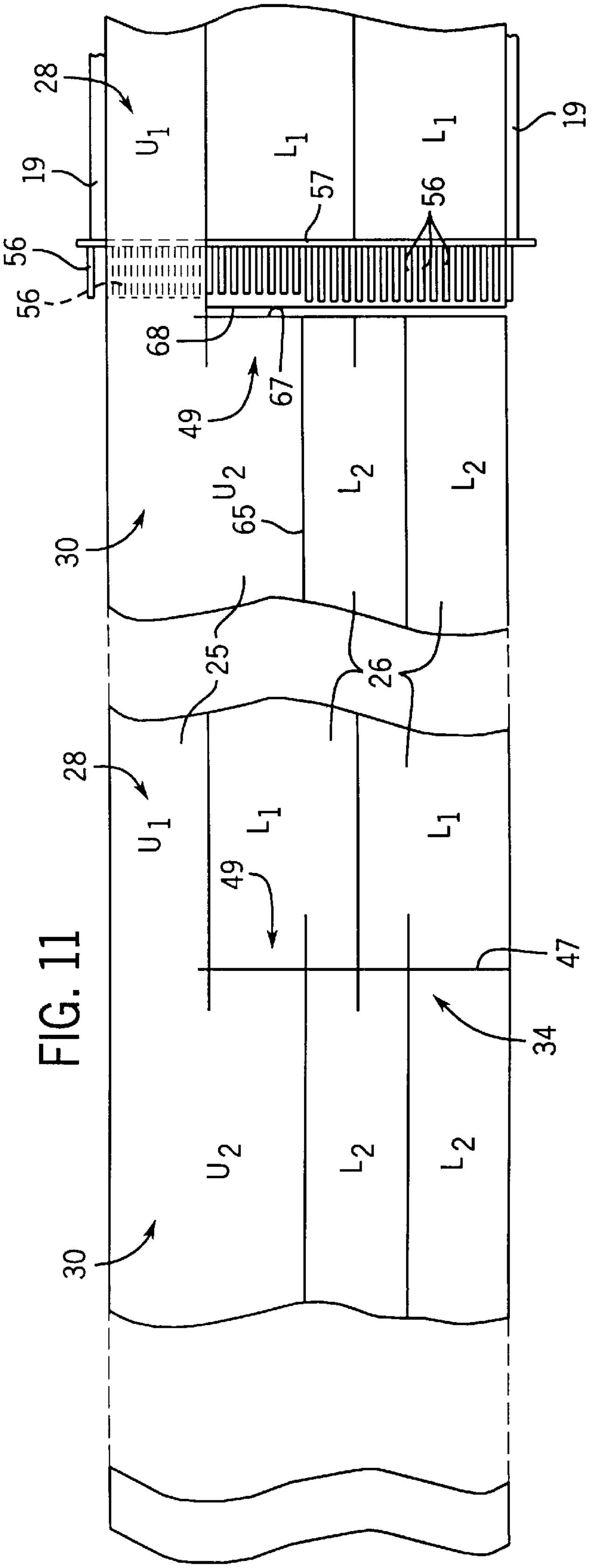
FIG. 11 is a top plan view of the transitional view of FIG. 8.

To effect a smooth redirection and transfer of web portion 49 from the lower slider table to the upper slider table, and referring also to FIG. 11, the forks 56 corresponding laterally to the length of the redirected web portion 49 are moved downwardly to a divert position on top of running order output web portion $L_1$ before the lead edge 67 of the redirected web portion of $U_2$ reaches the downstream edge 64 of the lift pan 61, as shown in FIG. 7. Referring to FIG. 8, in precise synchronization with movement of the trailing edge 68 of the redirected portion of running order web $L_1$ past the pan edge 64 and before passage of the lead edge 67 therepast, the lift pan 61 is pivoted upwardly from the running to the divert position. The lift pan runs the full lateral width of the web and will, therefore, cause the redirected web portion 49 to be lifted along with the remainder of the web. The holddown forks 56 corresponding to the width of lead edge 67 have already been dropped to the divert position and, as a result, the redirected web portion 49 will be directed upwardly without obstruction, along with the interconnected portions of running output web portion $U_1$ and the trailing portion of $U_2$ supported on the forks 56 which remain in the running position, as shown in FIG. 9.

As soon as the lead edge 67 of the redirected portion of $U_2$ passes the upstream ends 60 of the divert position forks 56, those forks are returned to the running position and the lift pan 61 is pivoted downwardly to also reassume its running position. Even though lift pan rotation upwardly to the divert position will cause the web 10 to be lifted across its full lateral width, also causing new order lower output web portions $L_2$ to be briefly deflected upwardly, the web selector forks 56 corresponding to the widths of web portions $L_2$ remain in the upward running position. This permits the output web portions $L_2$ to move smoothly between the ends 60 of the forks and the lower slider table 29.

In lieu of a full width lift pan 61, a series of lift fingers (not shown) which correspond to the forks 56 could also be used. The lift fingers would be individually operable such that only those fingers corresponding, in the above described example, to the width of the redirected web portion 49 would be raised to a divert position. However, this requires a substantially more complex construction and is not believed to be necessary for proper functioning of the web divert apparatus and method described herein.

Figure 10:
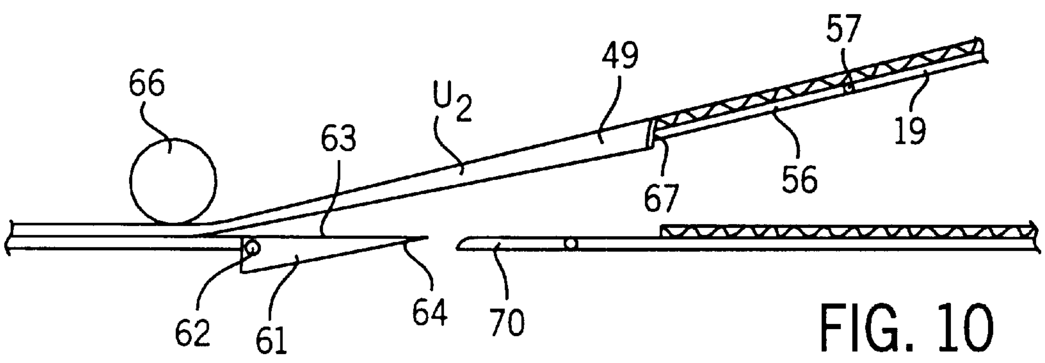

In an alternate embodiment, the upstream edge of the lower slider table 29 may be provided with a series of edge fingers 70 mounted on a common pivot axis 71 parallel to the fork axis 57 and pan axis 62. The fingers 70 extend in the upstream direction and are aligned vertically with the forks 56. The fingers 70 are biased to a normal running position such that they lie coplanar with the web support surface of the slider table 29. However, when the corresponding forks 56 are pivoted downwardly into the divert position, such as shown in FIG. 8, the upstream ends of the fingers 70 are deflected downwardly against the biasing return force. The downward deflection of the edge fingers 70 provides a somewhat enlarged vertical opening to assure smooth passage of the lead edge 67 of the redirected web portion 49, thereby minimizing the possibility of collision with the upstream edge of the lower slider table 29. In particular and referring to the selector fork rotation sequence shown in the transition from FIG. 7 to FIG. 8, the forks may be initially lowered onto the running web in preparation for the divert, but without deflecting the edge fingers 70 downwardly. Then in response to movement of the trailing edge 68 of the redirected portion of $L_1$ past the edge 64 of the lift pan 61 and rotation thereof upwardly, the forks 56 are rotated further downwardly to deflect the edge fingers 70 as indicated. This provides a positive scissors-like action assuring separation of the downstream and upstream portions of the redirected web portion 49 along the slit line 47. When the forks 56 are returned to the running position, as shown in FIG. 10, the biasing force automatically returns the fingers 70 to the running position.

The web redirection facilitation provided by the apparatus and method of the present invention will operate in substantially the same manner already described to facilitate upward redirection of the redirected web portion 39 in FIG. 2. In this order change strategy, however, the selector forks 56 corresponding to the full width of new order output web portion $U_2$ will be moved to the divert position. This is because transverse slit 33 is made from the upper output edge of the web and, as a result, $U_2$ is completely separated from the running order output web portions $U_1$ and $L_1$. As described with respect to the FIG. 2 order transition, there is no gap along transverse slit 33 between the running order lower output web portion $L_1$ and the new order upper output web portion $U_2$ to permit the use of prior art web selector forks as shown and described above with respect to FIG. 5. However, the apparatus of the present invention will operate effectively to redirect web portion 39 as described above without any longitudinal gap.

In the order change sequence of FIG. 4, the redirected web portion 73 is separated from running order upper output web portion $U_1$ by the transverse slit 37. Because the transverse slit is made upstream of the web selector device 27, redirected web portion 73 simply remains on the lower level as a portion of innermost new lower output web portion $L_2$. No rotation of forks 56 corresponding to redirected web portion 73 is necessary. However, the forks 56 corresponding to the width of new order upper output web $U_2$ are rotated down to the divert position and the lift pan 61 is simultaneously pivoted upwardly to assure upward diversion of the lead edge 41 of $U_2$ which has been separated from $U_1$ by the slit 37.

I claim:

1. A web selector device for changing the vertical direction of a selected output web portion of a moving web exiting a slitting device between a lower web table carrying lower output web portions and an upper web table carrying upper output web portions, the web tables having respective upstream ends, said device comprising:

web selector forks pivotally attached on a common horizontal fork axis to the upstream end of the upper web table and extending upstream therefrom to free upstream fork ends;

said forks overlying an upstream portion of the lower web table and individually rotatable on said fork axis between a running position in generally coplanar alignment with the upper web table and with the fork ends spaced above the upstream end of the lower web table, and a divert position with the fork ends pivoted downwardly into operative engagement with said upstream end of the lower web table;

a lift device pivotally mounted under the web upstream of the web tables on a horizontal lift axis parallel to the fork axis, said lift device having a web support surface extending in the downstream direction from said lift axis to a lift edge;

said lift device having a running position with the web support surface lying generally coplanar with the lower web table, and a divert position with the lift edge pivoted upwardly to a position adjacent the fork ends in the running position; and, a control device responsive to the position of a generally transverse web slit defining the leading edge of the selected output web portion to pivot the lift device and the selector forks corresponding to the transverse slit from the running position to the divert position.

2. The apparatus as set forth in claim 1 wherein said lift device comprises a lift pan extending across the full width of the web.

3. The apparatus as set forth in claim 1 and further comprising:

pivotal edge fingers defining the upstream end of the lower web table and attached thereto on a pivot axis parallel to said fork and lift axes, said edge fingers having top surfaces substantially coextensive with the lower web table in a running position;

said edge fingers positioned to be engaged and pivoted downwardly by the fork ends as said fork ends are pivoted downwardly to the divert position; and, a bias mechanism operative to return said edge fingers to the running position in response to return of the selector forks to the running position.

4. The apparatus as set forth in claim 3 wherein said edge fingers extend across the full width of the lower web table.

5. The apparatus as set forth in claim 4 wherein said forks are equally spaced across the width of the web and aligned vertically with said edge fingers.

6. A method for vertically redirecting a selected width of an output web portion comprising one of a plurality of longitudinally slit portions of a moving paperboard web, which slit portions define laterally adjacent upper and lower output web portions respectively directed to an upper web table and a lower web table to define a running order, and wherein the selected width represents an increase in the total width of the upper output web portion and a corresponding decrease in the adjacent lower output web portion to define a new order, said method comprising the steps of:

(1) selecting an order change region in the moving web defining a transition from the running order to the new order;

(2) adjusting the slit portion in the order change region from the running order to the new order such that the running order and new order slit portions overlap longitudinally;

(3) slitting the web in the order change region and upstream of the web tables in a transverse direction to provide a transverse slit in at least the full selected width between adjacent slit lines;

(4) positioning the upper and lower web tables in vertically spaced relation with respective upstream edges generally vertically aligned; and, (5) separating the web vertically and upstream of the upper web table at said transverse slit by simultaneously lifting the web vertically to direct the selected width web upstream of said transverse slit onto the upper web table and maintaining the selected width web portion downstream of said transverse slit on the lower web table.

7. The method as set forth in claim 6 wherein said separating step comprises:

(1) providing the upper web table with web selector forks pivotally attached to the table on a common laterally extending horizontal fork axis, said forks extending to upstream fork ends defining the upstream edge of the table;

(2) pivoting the forks corresponding to the transverse slit downwardly onto the selected width web portion downstream of the transverse slit on the lower web table; and, (3) supporting the selected width web portion upstream of the slit on said downwardly pivoted forks to direct said selected web portion onto the upper web table.

8. The method as set forth in claim 7 wherein said lifting step comprises:

(1) positioning a pivotal lift device under the web upstream of the web tables on a horizontal pan axis parallel to said fork axis with a web supporting lift surface extending downstream; and, (2) pivoting the device upwardly to lift the web.

9. The method as set forth in claim 7 including the steps of:

(1) providing the lower web table with pivotal edge fingers having free ends defining the upstream end of the table and attached thereto on a pivot axis parallel to the fork axis;

(2) biasing said edge fingers upwardly to lie in the plane of said lower web table; and, (3) deflecting said edge fingers, corresponding to the selected width web portion, downwardly with the ends of the forks in the pivoting step.

* * * * *